United States Patent
Kamitani

(10) Patent No.: US 7,656,759 B2
(45) Date of Patent: Feb. 2, 2010

(54) INFORMATION RECORDING AND REPRODUCING DEVICE SUPPRESSING ERASURE OF DATA WHEN POWER INTERRUPTION OCCURS DURING DATA RECORDING

(75) Inventor: Tsuyoshi Kamitani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 566 days.

(21) Appl. No.: 11/524,625

(22) Filed: Sep. 21, 2006

(65) Prior Publication Data

US 2007/0064549 A1    Mar. 22, 2007

(30) Foreign Application Priority Data

Sep. 21, 2005    (JP) .............................. 2005-274327

(51) Int. Cl.
*G11B 5/09* (2006.01)
(52) U.S. Cl. .................................................. 369/47.11
(58) Field of Classification Search ........................ None
See application file for complete search history.

(56) References Cited

U.S. PATENT DOCUMENTS

| | | | |
|---|---|---|---|
| 5,453,967 A * | 9/1995 | Aramaki et al. | 369/47.11 |
| 5,473,584 A * | 12/1995 | Oshima | 369/47.11 |
| 2001/0026517 A1 * | 10/2001 | Tsukihashi et al. | 369/53.24 |
| 2005/0036422 A1 * | 2/2005 | Sasaki | 369/53.31 |
| 2005/0249072 A1 * | 11/2005 | Hayashi | 369/47.11 |

FOREIGN PATENT DOCUMENTS

| | | |
|---|---|---|
| JP | 2004-62947 | 2/2004 |
| JP | 2005-32374 | 2/2005 |
| JP | 2005-38570 | 2/2005 |

OTHER PUBLICATIONS

Patent abstracts of Japan, Publication No. 2005-038570, Publication Date: Feb. 10, 2005, 1 page.
Patent Abstracts of Japan, Publication No. 2005-032374, Publication Date: Feb. 3, 2005, 1 page.
Patent Abstracts of Japan, Publication No. 2004-062947, Publication Date: Feb. 26, 2004, 1 page.

* cited by examiner

*Primary Examiner*—Peter Vincent Agustin
(74) *Attorney, Agent, or Firm*—Osha • Liang LLP

(57) ABSTRACT

In a record operation mode, a nonvolatile memory stores a record end address. In a restoring operation mode, the record end address stored in the nonvolatile memory is read, and a record end address in an FDCB is read and is compared with the record end address read from the nonvolatile memory to determine whether these addresses match with each other or not. When the record end address in the FDCB is different from the record end address stored in the nonvolatile memory, the data in the FDCB is updated based on the record end address stored in the nonvolatile memory.

4 Claims, 3 Drawing Sheets

INFORMATION RECORDING AND REPRODUCING DEVICE SUPPRESSING ERASURE OF DATA WHEN POWER INTERRUPTION OCCURS DURING DATA RECORDING

BACKGROUND OF THE INVENTION

1. Field of the Invention

The present invention relates to an information recording and reproducing device that can record and reproduce information onto or from an optical disk such as a DVD (Digital Versatile Disk).

2. Description of the Background Art

For recording data onto a DVD+RW disk that is a kind of recordable DVD disk, formatting processing is required before data recording.

In response to a formatting request of a user, the DVD+RW disk is processed such that a notification of completion of the formatting is provided to the user when only a part of a lead-in region is recorded, and then so-called background formatting will be performed. Thus, dummy data will be recorded on a residual region while access according to a user's access request is not performed.

This background formatting significantly reduces a formatting time that is long in a prior art.

In the background formatting, a device continuously records dummy data on a data region starting from its inner periphery.

When the device receives a data record request from a user during the background formatting, it interrupts the background formatting, and performs the requested data recording after updating an LWA (Last Written Address) of the continuous record.

After the data recording is completed, the formatting processing restarts from the LWA. During the background formatting, the user can perform random recording of data on the whole data region.

Thus, the formatting processing allows recording of the data even on a region on which the dummy data is not yet recorded by the formatting processing, and therefore data recorded regions and data unrecorded regions are present in a mixed fashion if the user performs the data recording during the background formatting. For resuming the background formatting when the data recorded regions and the data unrecorded regions are present in a mixed fashion, the dummy data must be recorded on the regions other that the regions where the user has already recorded the data. Therefore, the information recording and reproducing device generally employs such a managing manner that a record state, e.g., of a region (1 ECC block=16 sectors in the case of the DVD+RW disk) forming a record unit is managed with a flag (bit map information) of one bit.

More specifically, when the user performs the data recording on a region radially outside the LWA, the flag on the bit map corresponding to this region is set to "recorded". For resuming the background formatting thereafter, the dummy data recording is performed on only the unrecorded region with reference to this bit map information.

When the DVD+RW disk is used, the background formatting can be interrupted for taking out the disk.

In this case, the LWA and bit map information are recorded in an FDCB (Formatting Disk Control Block) in the lead-in region.

When the disk that was partially formatted is reloaded, the FDCB can be referred to, and thereby the background formatting can be resumed to record dummy data only in the unrecorded region.

When the background formatting is interrupted and the disk is taken out, the FDCB serves as very important information for determining the record state of the disk. When a failure occurs in updating of the FDCB, such a problem may occur that the background formatting will overwrite the data recorded by the user with the dummy data.

As an example of use of the DVD+RW disk, there is real-time recording of, e.g., TV programs. For such real-time data recording, a user requests the data recording with a relatively low transfer rate and constant intervals. For performing the real-time data recording during the background formatting, therefore, the dummy data recording for the formatting processing is not performed, the data recording requested by the user continues until the record time elapses. In other words, the record updating of the FDCB cannot be performed during the real-time data recording, and this may result in a problem that the FDCB cannot be accurately updated, e.g., when unexpected power interruption occurs during recording due to a power failure or the like.

When the above disk is reloaded, erroneous information is recorded in the LWA and/or the bit map information to be referred to for resuming the background formatting. This results in a problem that the formatting overwrites the user data already recorded with the dummy data.

Japanese Patent Laying-Open No. 2005-038570 has disclosed a manner in which user data recording on a disk is interrupted during execution of the data recording based on whether a quantity of data stored in a cache memory exceeds a predetermined threshold or not, and a FDCB is updated during the interruption.

According to the manner disclosed in the above reference, however, the data recording must be interrupted whenever the data quantity exceeds the predetermined threshold, and this lowers the performance of data recording. Since the FDCB of the disk is updated whenever the quantity exceeds the predetermined threshold, this increases the number of times of updating the FDCB. Since the number of times of the FDCB updating cannot be increased infinitely, such updating may degrade the disk.

SUMMARY OF THE INVENTION

An object of the invention is to overcome the above problems, and particularly to provide an information recording and reproducing device that suppresses erasure of recorded data even when unexpected power interruption such as a power failure occurs during data recording, while suppressing lowering of a data recording performance and degradation of a disk.

An information recording and reproducing device according to the invention includes a recording and reproducing portion recording and reproducing data onto or from a data-recordable information record medium; a memory capable of nonvolatilely recording the data; and a controller controlling the whole device. The controller stores a record address indicative of a record position of the data in the memory in a data record operation. The recording and reproducing portion performs recording and updating on the information record medium according to an instruction of the controller after completion of the data recording to record and update a record end address being a record address indicative of a last data record position included in management information relating to the data recording. When the data recording is to be resumed after interruption of the data recording, the controller instructs the recording and reproducing portion to reproduce the record end address included in the management information on the information record medium. The recording and reproducing portion records the record address stored in the memory onto the information record medium to update the record end address based on a result of comparison between the record address stored in the memory and the reproduced record end address. The information record medium has a management region storing the management information and a data region recording the data. The data region is divided into a plurality of sectors each forming a minimum access unit. The controller stores the record address in the memory after completion of the data recording corresponding to each of the sectors. The recording and reproducing portion further records lead-out at a position after the last data record position on the information record medium after the completion of the data recording, and will record the lead-out at a position after the data record position being the record address stored in the memory when the data recording is to be resumed after occurrence of interruption of the data recording.

An information recording and reproducing device according to the invention includes a recording and reproducing portion recording and reproducing data onto or from a data-recordable information record medium; a memory capable of nonvolatilely recording the data; and a controller controlling the whole device. The controller stores a record address indicative of a record position of the data in the memory in a data record operation. The recording and reproducing portion performs recording and updating on the information record medium according to an instruction of the controller after completion of the data recording to record and update a record end address being a record address indicative of a last data record position included in management information relating to the data recording. When the data recording is to be resumed after interruption of the data recording, the recording and reproducing portion operates according to an instruction of the controller to record and update the record end address included in the management information on the information record medium based on the record address stored in the memory.

Preferably, the information record medium has a management region storing the management information and a data region recording the data. The data region is divided into a plurality of sectors each forming a minimum access unit.

Preferably, the record address is stored in the memory after completion of the data recording corresponding to each of the sectors.

Preferably, the recording and reproducing portion further records lead-out at a position after the last data record position on the information record medium after the completion of the data recording, and will record the lead-out at a position after the data record position being the record address stored in the memory when the data recording is to be resumed after occurrence of interruption of the data recording.

Preferably, when the data recording is to be resumed after interruption of the data recording, the controller instructs the recording and reproducing portion to reproduce the record end address included in the management information on the information record medium. The recording and reproducing portion records the record address stored in the memory onto the information record medium to update the record end address based on a result of comparison between the record address stored in the memory and the reproduced record end address.

According to the information recording and reproducing device of the invention, the controller operates to store the record address indicative of the data record position in the memory when recording the data. When the data recording is to be resumed after interruption of the data recording, the controller operates to record and update the record end address included in the management information on the information record medium based on the record address stored in the memory according to the instruction of the controller. Therefore, even when unexpected power interruption such as a power failure occurs during the data recording, it is possible to suppress erasure of the data already recorded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description and drawings, the same or corresponding portions bear the same reference numbers, and description thereof is not repeated.

Figure 1:
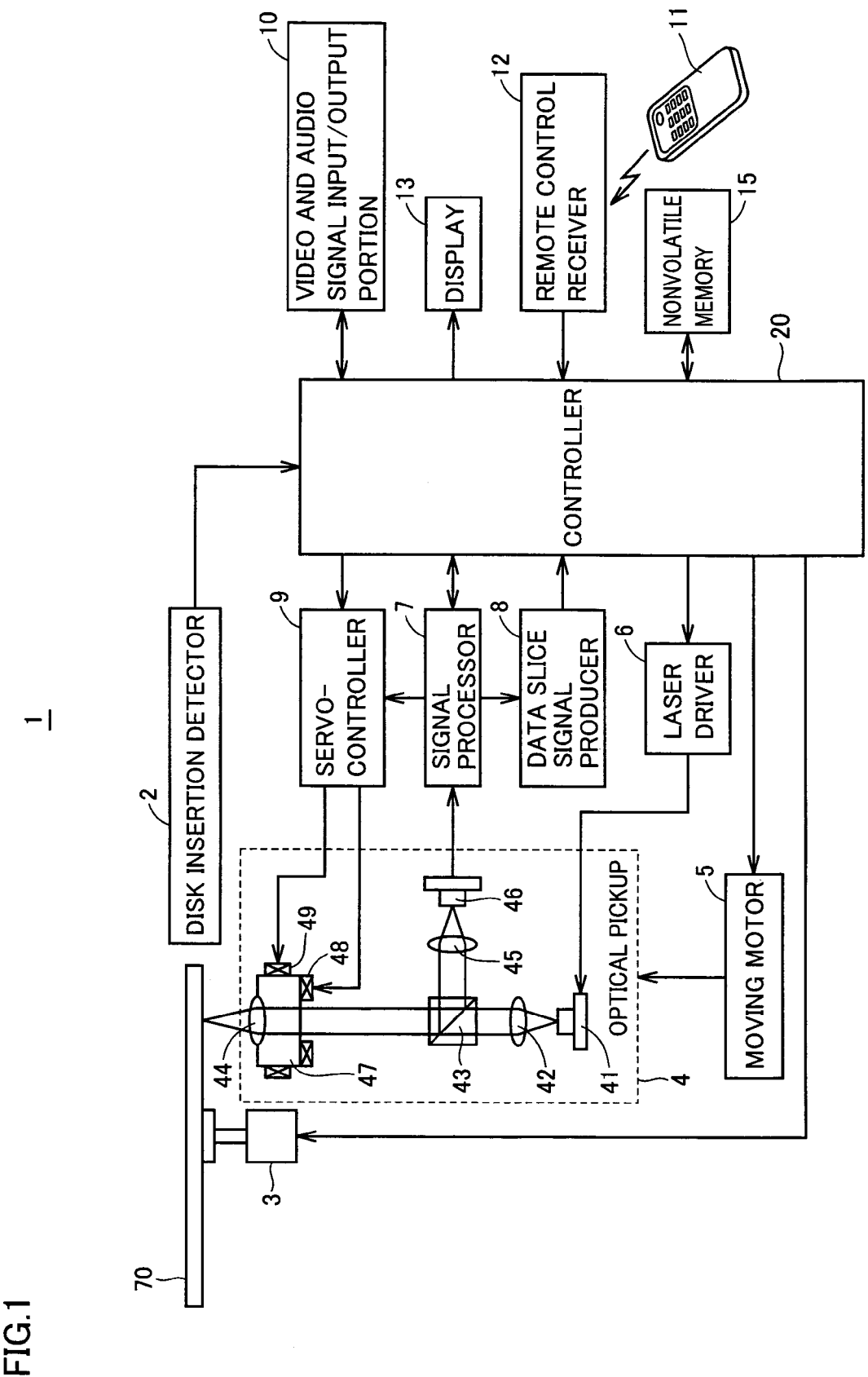
FIG. 1 is a block diagram schematically showing an information recording and reproducing device according to an embodiment of the invention.

Referring to FIG. 1, an information recording and reproducing device 1 according to an embodiment of the invention records information of music, movies or the like on an optical disk 70 such as a DVD provided with concentric or spiral information record track(s), and/or reproduces such information.

Optical disk recording and reproducing device 1 includes a disk insertion detector 2, a spindle motor 3, an optical pickup 4, a moving motor 5, a laser driver 6, a signal processor 7, a data slice signal producer 8 and a servo-controller (focusing controller and tracking controller) 9. Further, information recording and reproducing device 1 includes a video and audio signal input/output portion 10, a remote control 11, a remote control receiver 12, a display 13 and a controller 20 for controlling the foregoing various portions.

Disk insertion detector 2 detects an optical disk that is inserted through a disk insertion portion (not shown) and is laid onto a disk tray, and provides a signal indicative of it to controller 20. Inserted optical disk 70 is attached to spindle motor 3. Spindle motor 3 rotates loaded optical disk 70 at a predetermined speed according to an instruction provided from controller 20.

Optical pickup 4 emits a light beam onto optical disk 70 for recording and/or reproducing the information, receives a light beam reflected by optical disk 70 and converts it to an electric signal. According to the instruction provided from controller 20, moving motor 5 formed of a linear motor moves optical pickup 4 radially over optical disk 70.

Optical pickup 4 is configured to collect and direct the light beam emitted from a semiconductor laser 41 onto optical disk 70 through a collimate lens 42, a beam splitter 43 and an objective lens 44. Also, it is configured to receive the light reflected from optical disk 70 by a photodetector 46 through objective lens 44, beam splitter 43 and a condenser lens 45.

Laser driver 6 that operates in response to instructions provided from controller 20 controls the light emission of semiconductor laser 41. Photodetector 46 is formed of a divided photodiode that has a light receiving surface divided into a plurality of regions, and can provide electric signals corresponding to intensities of light received by respective light receiving surfaces. Photodetector 46 provides its output signal to signal processor 7.

A lens holder 47 holds objective lens 44, and is provided with a focusing coil 48 and a tracking coil 49. Focusing coil 48 is configured to move objective lens 44 in a direction perpendicular to the disk surface of optical disk 70 by a magnetic operation with respect to a magnet (not shown). Tracking coil 49 is likewise configured to move objective lens 44 in a direction parallel to the disk surface of optical disk 70 and perpendicular to the record track on optical disk 70.

Signal processor 7 produces an RF signal (reflection intensity) based on the output signal of photodetector 46, and provides it to data slice signal producer 8. Data slice signal producer 8 produces a data slice signal by binarizing the RF signal, and provides it to controller 20. Controller 20 detects pits formed on optical disk 70 based on this data slice signal.

Signal processor 7 produces a focus error signal and a track error signal based on the output signal of photodetector 46, and provides it to servo-controller 9. The focus error signal corresponds to a quantity by which a focus point of light emitted through objective lens 44 onto optical disk 70 deviates from optical disk 70 surface, and the track error signal corresponds to the quantity of deviation of the light focus point from the record track.

Servo-controller 9 controls the current supply to focusing coil 48 and tracking coil 49 to move objective lens 44 based on the focus error signal and the track error signal, and thereby performs the servo-control to locate the light focus point on the disk surface of optical disk 70 and on the record track.

Audio and video signal input/output portion 10 is connected to an external device (not shown) such as a display, a loud speaker or a television set, and operates to output video and audio signals reproduced from optical disk 70, and to receive video and audio signals from the external device.

Remote control 11 is employed for controlling various operations of information recording and reproducing device 1, and includes operations keys (not shown) for controlling the various operations. Remote control 11 transmits infrared signals corresponding to key operations, respectively. Remote control receiver 12 receives the infrared signal transmitted from remote control 11, and provides the received signal to controller 20. Display 13 is arranged on a front panel of the body of information recording and reproducing device 1, and displays contents of operations selected by remote control 11, operation situations of information recording and reproducing device 1 and the like.

Controller 20 has a storage portion (not shown) storing various control programs such as control programs for instructing execution of various operations (e.g., background formatting) and control programs for executing an initial operation, ordinary data writing and reading, restoring processing (to be described later) and the like.

Description will now be given on the recording and reproducing of the information onto or from optical disk 70. The information is reproduced from optical disk 70 by rotating optical disk 70 at a predetermined speed by spindle motor 3, emitting the light beam from semiconductor laser 41 to optical disk 70 and collecting the reflected light by photodetector 46. Servo-controller 9 controls the current supply to focusing coil 48 to move objective lens 44 based on the focus error signal provided from signal processor 7 so that focus-on is achieved to locate the focus point of the light emitted from semiconductor laser 41 on optical disk 70 surface. Further, servo-controller 9 controls the current supply to tracking coil 49 to move objective lens 44 based on the track error signal provided from signal processor 7 so that track-on is achieved to locate the focus point of the light emitted from semiconductor laser 41 on the desired record track.

After the focus-on and the track-on, servo-controller 9 controls the current supply to focusing coil 48 and tracking coil 49 based on the focus error signal and track error signal so that the focusing servo-control and the tracking servo-control are performed to maintain the focus-on state and the track-on state, respectively.

In the servo-controlled state, data slice signal producer 8 receives and binarizes the RF signal provided from signal processor 7 to provide a data slice signal to controller 20. Controller 20 detects presence/absence of pits on optical disk 70 based on the data slice signal, reads the information recorded on optical disk 70 to reproduce the video and audio signals from the read information and proves them from video and audio signal input/output portion 10 to an external device.

Recording of the information onto optical disk 70 is likewise performed by forming pits on optical disk 70 with a laser beam emitted from semiconductor laser 41 in the focusing and tracking servo-controlled states. In this operation, controller 20 encodes the video and audio signals provided from video and audio signal input/output portion 10, and semiconductor laser 41 emits the light according to the encoded data under the control of controller 20. Thereby, the pits corresponding to the encoded data is formed at the record track on optical disk 70 to record the video and audio information. The pits can be formed by emitting the light from semiconductor laser 41 with a power higher than that in the information read operation.

Data contents of the FDCB of the DVD+RW disk will now be described.

TABLE 1

| Physical Sector | Main Data | Contents | Details | |
|---|---|---|---|---|
| 0 | D0-D3 | Content Descriptor | Contents recorded in DCB are described. "FDC" is recorded in FDCB | |
| | D4-D7 | Unknown Content Descriptor Actions | Bit31-4 | Reserved |
| | | | Bit3 | DCB overwrite: Inhibit (1) or allow (0) DCB update |
| | | | Bit2 | Formatting: Inhibit (1) or allow (0) reformatting |

TABLE 1-continued

| Physical Sector | Main Data | Contents | Details | |
|---|---|---|---|---|
| | | | Bit1 | DCB read protect: Inhibit (1) or allow (0) external transfer of DCB from drive |
| | | | Bit0 | Data Zone Write: Inhibit (1) or allow (0) Data Zone recording |
| | D8-D23 | Drive ID (Drive manufacturer) | Manufacturer of drive recording DCB | |
| | D24-D35 | Drive ID (Drive mode name) | Model name of drive recording DCB | |
| | D36-D39 | Drive ID (Drive S.N.) | Serial Number of drive recording DCB | |
| | D40-D43 | FDCB Update Count | Total number of times of FDCB updating is set | |
| | D44 | Formatting Status Flags | Bit7-6 | Formatting Status: 00 = Disk is not formatted |
| | | | | 01 = Disk is partially formatted |
| | | | | 10 = Disk is already formatted by user |
| | | | | 11 = Disk is already formatted by manufacturer |
| | | | Bit5 | Formatting Open: |
| | | | | 0 = FDCB recorded on disk indicates current state of disk |
| | | | | 1 = Disk is being formatted. FDCB recorded on disk may not indicate current state of disk |
| | | | Bit4-0 | Reserved |
| | D45 | Verification Status Flags | Bit7-6 | Verification Status: |
| | | | | 00 = Disk is not verified |
| | | | | 01 = Disk is partially verified |
| | | | | 10 = Disk is already verified by user |
| | | | | 11 = Disk is already verified by manufacturer |
| | | | Bit5-0 | Reserved |
| | D46 | Recording Status Flags | Bit7 | Lead-in Status: |
| | | | | 0 = Lead-in is recorded at 02A480h-02FFFFn |
| | | | | 1 = Lead-in is entirely recorded |
| | | | Bit6-5 | Lead-out Status: |
| | | | | 00 = Lead-out is not recorded |
| | | | | 01 = Temporary Lead-out is recorded |
| | | | | 10 = Lead-out is recorded at 260540h-26193Fh |
| | | | | 11 = Lead-out is entirely recorded |
| | | | Bit4-0 | Reserved |
| | D47 | Reserved | All 0 | |
| | D48-D51 | LWA | Last recorded address is recorded. Set to 0 when unused | |
| | D52-D55 | LVA | Last verified address is recorded. Set to 0 when unused | |
| | D56-D59 | Bitmap Start Address | First ECC Block address recorded in Formatting Bitmap Set to 0 when already formatted or unused | |
| | D60-D63 | Bitmap Length | Number of ECC Blocks recorded in Formatting Bitmap Set to 0 when already formatted or unused | |
| | D64-D95 | Disc ID | Random value is set | |
| | D96-D127 | Application Dependent | Region for peculiar use by application. Set to 0 when unused | |
| | D128-D2047 | Reserved | All 0 | |
| 1-9 | D0-D2047 | Formatting Bitmap | Each bit indicates record state of ECC block based on Bitmap Start Address | |
| 10-15 | D0-D2047 | Reserved | All 0 | |

The above table illustrates, by way of example, 16 sectors (0-15) as physical sectors of a part of FDCB. One sector is formed of 2048 data. For example, main data D0-D2047 are illustrated in connection with the physical sector of sector 0, and these data include information relating to the format, manufacturer and the like. The LWA (Last Written Address), i.e., the last recorded address is recorded as main data D48-D51.

Description will now be given on the data recording according to the embodiment of the invention with reference to a flowchart of FIG. 2.

Figure 2:
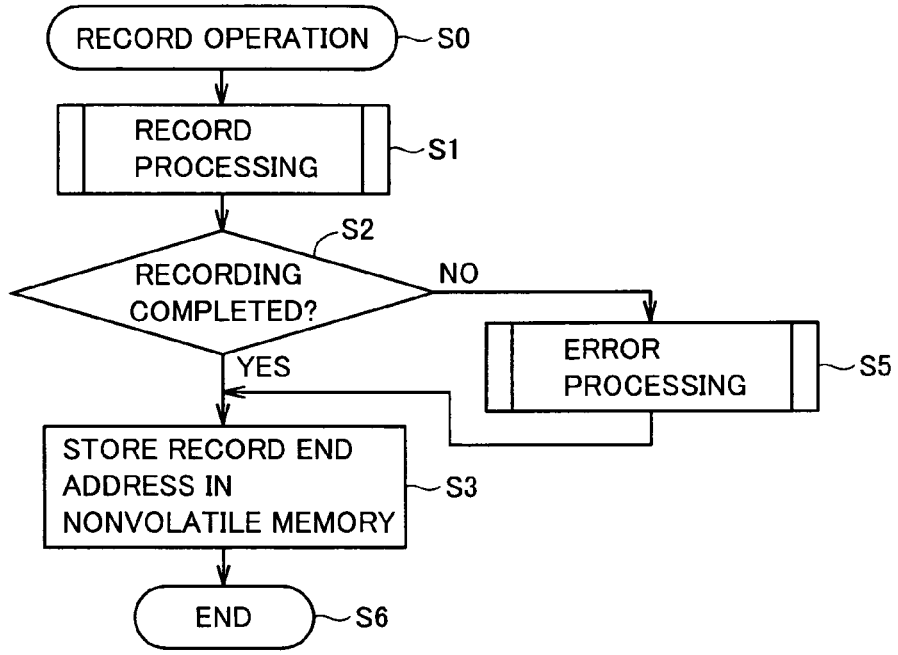
FIG. 2 is a flowchart illustrating data recording according to the embodiment of the invention.

Referring to FIG. 2, when a user enters a request instruction for data recording, the controller starts a record operation mode (step S0). Then, controller executes the data record processing (step S1). Details of the data record processing are general techniques, and therefore will not be described.

It is determined whether the data record processing is completed normally or not (step S2). Specifically, this determination is performed by determining whether lead-out is stored after the last record address or not.

When controller 20 determines in step S2 that the data record processing is completed, it stores the record address, i.e., the last record position of the data recording as the record end address in a nonvolatile memory 15.

Then, the record operation mode ends (step S6).

When controller 20 determines in step S2 that the data record processing is not completed, it executes error processing (step S5). For example, when unexpected power interruption such as a power failure occurs, the controller determines that the data record processing is not completed. In the above case, controller 20 assumes that a certain failure occurs in the device, and performs the error processing by terminating the operation while ensuring safety in the device. In this operation, controller 20 stores, e.g., a flag indicative of occurrence of the error in the storing portion, and thereby prepares for appropriately executing the restoring processing when the power is restored. In next step S3, the record address, i.e., the last record position of the data recording is stored as the record end address in nonvolatile memory 15. Then, the process proceeds to step S6. When the unexpected power interruption such as a power failure occurs, the operations such as error processing are performed with a backup power supply (not shown).

The restoring operation according to the embodiment of the invention will now be described with reference to a flowchart of FIG. 3.

Figure 3:
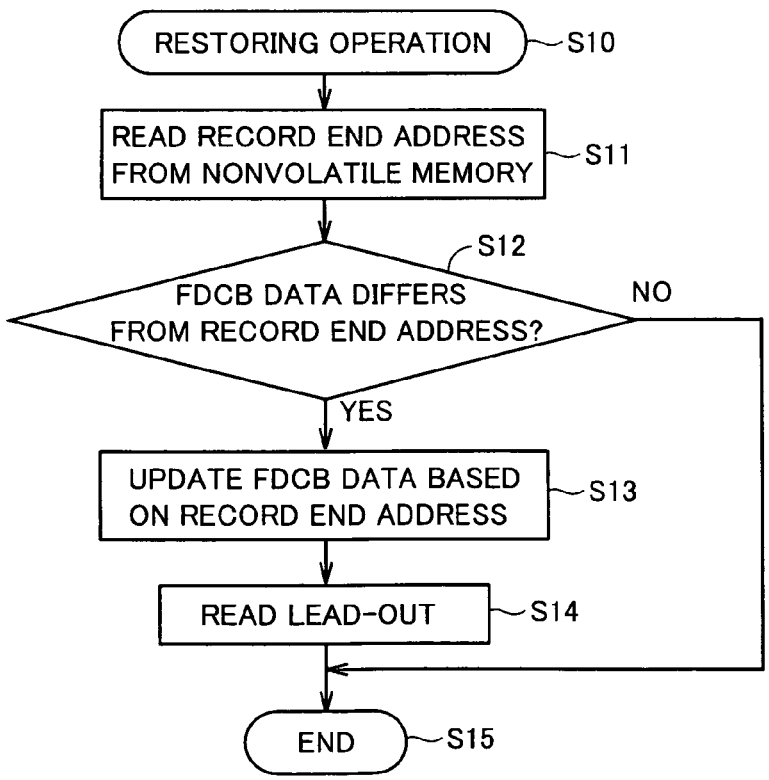
FIG. 3 is a flowchart illustrating a restoring operation according to the embodiment of the invention.

Referring to FIG. 3, when the power is turned on, a flag indicating occurrence of an error may be present, and thus the error occurrence may be already stored in the storing portion. In this case, the process proceeds to the restoring mode (step S10).

Controller 20 reads the record end address stored in nonvolatile memory 15 (step S11).

Controller 20 reads the record end address in the FDCB data stored in the management region of optical disk 70, and determines whether it matches with the record end address stored in nonvolatile memory 15 or not (step S12). In this operation, controller 20 reads the information of the last record address included in the FDCB data recorded in the management region of optical disk 70 as already described with reference to FIG. 2.

In step S12, when the record end address in the FDCB is different from the record end address stored in nonvolatile memory 15, the data in the FDCB is updated based on the record end address stored in nonvolatile memory 15 (step S13). Thus, the value of LNA that is recorded in the management region of optical disk 70 and is illustrated in FIG. 2 is updated. Lead-out is recorded after the last record address position (step S14). Thereby, the restoring operation mode ends (step S15).

When it is determined in step S12 that the record end address in the FDCB matches with the record end address stored in nonvolatile memory 15, it is determined that no error occurred in connection with the data record processing, and the restoring operation ends (step S15).

According to the structure of the embodiment of the invention, even when the unexpected power interruption such as a power failure occurs, the FDCB can be updated based on the record end address stored in nonvolatile memory 15 so that the erasure of the data that are already recorded can be suppressed.

In the structure according to the embodiment of the invention, the device is configured to hold the record end address in the nonvolatile memory so that the performance relating to the record processing of optical disk 70 does not lower. Further, the number of times of updating the FDCB does not increases, and the degradation of the optical disk can be suppressed.

In the manner already described with reference to FIG. 2, nonvolatile memory 15 stores the record end address after completion of the data record processing. However, such a manner can naturally be employed that nonvolatile memory 15 stores a current record address while the data record processing is being executed.

The data recording will now be described with reference to a modification of the embodiment of the invention.

Figure 4:
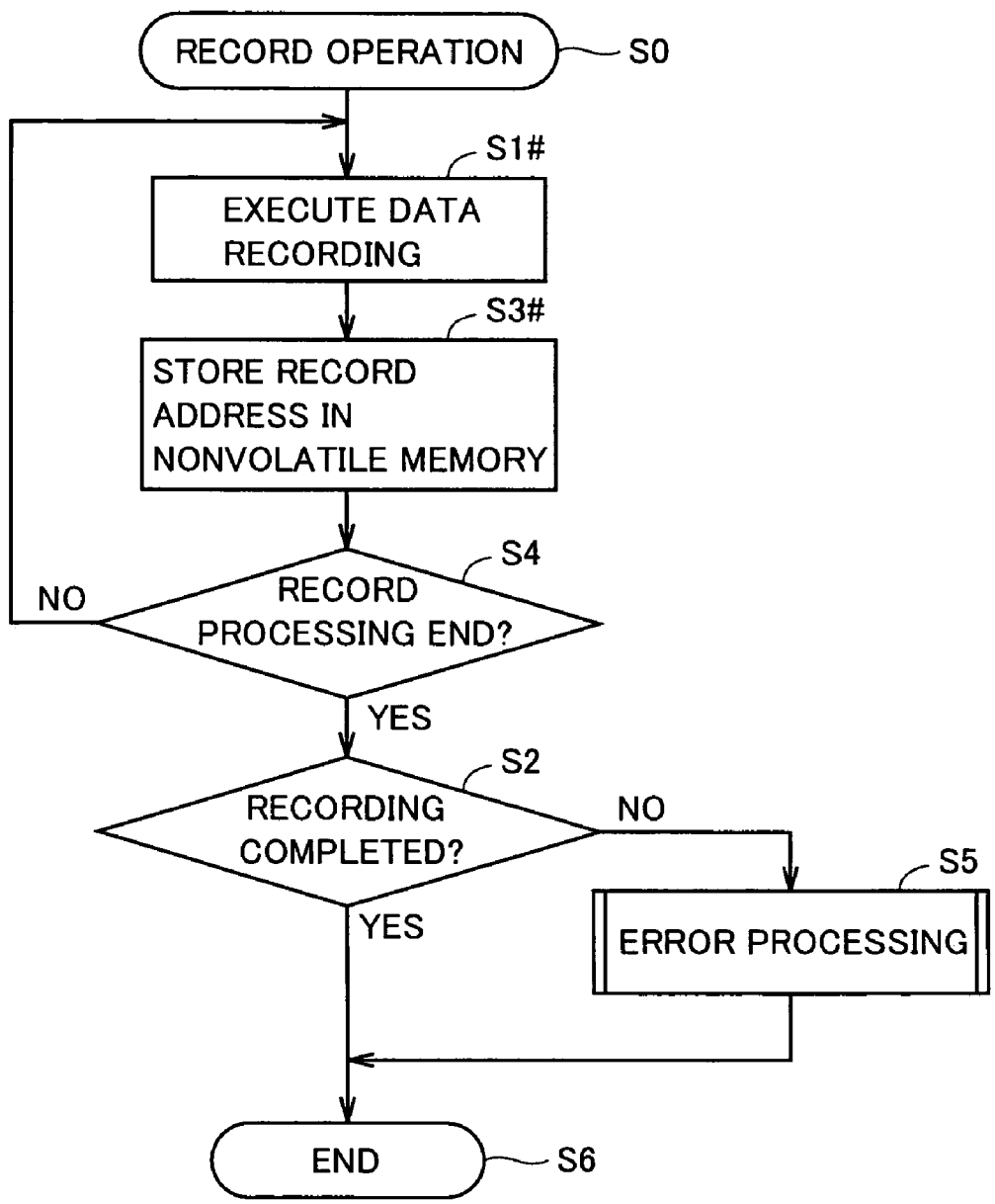
FIG. 4 is a flowchart illustrating data recording according to a modification of the embodiment of the invention.

Referring to FIG. 4, when a user enters a request instruction for the data recording, the controller starts the record operation mode (step S0), and executes the data recording (step S1#). Then, the controller stores in nonvolatile memory 15 the record address of the position where the data recording is executed on the optical disk (step S3#). It is determined whether the record processing of data recording ends or not (step S4), and the above steps S1# and S3# will be repeated until the record processing ends. When the record processing of the data record ends in step S4, it is determined whether the data record processing is completed normally or not (step S2). More specifically, this can be determined depending on whether the lead-out is stored after the address of the last recording or not.

When controller 20 determines in step S2 that the data record processing is completed, it ends the record operation mode (step S6).

When controller 20 determines in step S2 that the data record processing is not completed, the foregoing error processing is executed (step S5), and the process proceeds to step S6.

The restoring operation is substantially the same as that illustrated in FIG. 3.

In the above manner, nonvolatile memory 15 stores the record address during data recording, and always updates the record address with the latest address. Therefore, even when the unexpected power interruption such as a power failure occurs, the FDCB can be updated based on the record end address stored in nonvolatile memory 15, and therefore the erasure of the data already recorded can be suppressed.

Timing and the like for storing the record address in the nonvolatile memory can be configured to store the record address corresponding to each sector in nonvolatile memory 15 because the minimum data write unit is usually the sector. However, this is not restrictive, and nonvolatile memory 15 can store the record address corresponding to a predetermined period or a predetermined data quantity, instead of each sector. Even in these cases, since the device internally stores the record address by nonvolatile memory 15 similarly to the foregoing case, the data recording on the disk is not temporarily interrupted, and lowering of the performance related to the disk record processing can be prevented.

The embodiments have been described in connection with examples using the DVD+RW disk, the invention is not restricted to it, and can be applied to the DVD-RW disk and other optical disk according to substantially the same manners.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information recording and reproducing device comprising:
a recording and reproducing portion recording and reproducing data onto and from a data-recordable information record medium,
a memory for nonvolatile recording of data, and
a controller controlling the whole device, wherein
said controller stores a record address, indicative of a record position of said data, in said memory in a data record operation, wherein
said recording and reproducing portion recording and updating a record end address on said information record medium after completion of said data recording;
when said data recording is resumed after interruption of said data recording, said controller instructs said recording and reproducing portion to reproduce said record end address;
said recording and reproducing portion records said record address stored in said memory onto said information record medium to update said record end address when said record address stored in said memory and said reproduced record end address are different,
said information record medium has a management region storing said management information and a data region recording said data,
said data region is divided into a plurality of sectors each forming a minimum access unit,
said controller stores said record address in said memory after completion of the data recording corresponding to each of said sectors, and said recording and reproducing portion further records a lead-out at a position after the last data record position on said information record medium after the completion of said data recording, and records the lead-out at a position after said data record position indicated by said record address stored in said memory when said data recording is resumed after occurrence of interruption of said data recording.

2. An information recording and reproducing device comprising:
- a recording and reproducing portion recording and reproducing data onto and from a data-recordable information record medium;
- a memory for nonvolatile recording of data; and
- a controller controlling the whole device, wherein
- said controller stores a record address indicative of a record position of said data in a data record operation in said memory,
- said recording and reproducing portion recording and updating of a record end address on said information record medium after completion of said data recording, and recording and updating said record end address based on said record address stored in said memory, when said data recording is resumed after interruption of said data recording, and
- said recording and reproducing portion further records a lead-out at a position after the last data record position on said information record medium after the completion of said data recording, and records the lead-out at a position after the data record position indicated by said record address stored in said memory when said data recording is resumed after occurrence of interruption of said data recording.

3. The information recording and reproducing device according to claim 2, wherein
- said information record medium has a management region storing management information and a data region recording said data,
- said data region is divided into a plurality of sectors each forming a minimum access unit, and
- said controller stores said record address in said memory after completion of the data recording corresponding to each of said sectors.

4. The information recording and reproducing device according to claim 2, wherein
- when said data recording is to be resumed after interruption of said data recording, said controller instructs said recording and reproducing portion to reproduce said record end address, and
- said recording and reproducing portion records said record address stored in said memory onto said information record medium to update said record end address when the record address stored in said memory and said reproduced record end address are different.

* * * * *